US012739168B2

(12) United States Patent
Sharp et al.

(10) Patent No.: US 12,739,168 B2
(45) Date of Patent: Sep. 15, 2026

(54) SYSTEMS AND METHODS FOR NETWORK-AWARE CONTAINER ORCHESTRATION WITH TRANSPORT RESOURCE OPTIMIZATION

(71) Applicant: VERIZON PATENT AND LICENSING INC., Basking Ridge, NJ (US)

(72) Inventors: John T. Sharp, Selma, TX (US); Jermaine L. Wilson, Haslet, TX (US); Peter B. Sensenbrenner, North Richland Hills, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 26 days.

(21) Appl. No.: 19/055,831

(22) Filed: Feb. 18, 2025

(65) Prior Publication Data

US 2026/0246693 A1 Aug. 20, 2026

(51) Int. Cl.

| | |
|---|---|
| ***G06F 15/173*** | (2006.01) |
| ***H04L 41/0806*** | (2022.01) |
| ***H04L 41/0895*** | (2022.01) |
| ***H04L 41/12*** | (2022.01) |
| ***H04L 43/0876*** | (2022.01) |

(52) U.S. Cl.

CPC ...... *H04L 41/0806* (2013.01); *H04L 41/0895* (2022.05); *H04L 41/12* (2013.01); *H04L 43/0876* (2013.01)

(58) Field of Classification Search

CPC . H04L 41/0806; H04L 41/0895; H04L 41/12; H04L 43/0876

See application file for complete search history.

(56) References Cited

U.S. PATENT DOCUMENTS

| | | | | |
|---|---|---|---|---|
| 11,442,652 | B1 * | 9/2022 | Dailey | H04L 67/1097 |
| 2018/0219877 | A1 * | 8/2018 | Hsu | H04L 63/1408 |
| 2018/0314550 | A1 * | 11/2018 | Chen | G06F 9/4881 |
| 2024/0095158 | A1 * | 3/2024 | Miriyala | G06F 11/3696 |
| 2024/0179089 | A1 * | 5/2024 | Cirkovic | H04L 45/748 |
| 2025/0106108 | A1 * | 3/2025 | Agarwal | H04L 41/0893 |
| 2025/0384084 | A1 * | 12/2025 | Batsakis | G06F 16/2471 |
| 2026/0095390 | A1 * | 4/2026 | Subramaniam | H04L 41/16 |

* cited by examiner

*Primary Examiner* — Phuoc H Nguyen

(57) ABSTRACT

Systems and methods for network-aware container orchestration include receiving pod deployment requests that specify network transport requirements. Router resource data indicating current protocol support and resource utilization is obtained from routers in the container orchestration environment. Additionally, topology mapping data showing the connections between worker nodes and routers is retrieved. The system filters available worker nodes based on both the router resource data and topology mapping to identify candidate nodes having access to router resources that match the pod's network transport requirements. An optimal node is then selected from these candidates based on computational resource availability, and the pod is deployed to the selected node. This approach ensures that pods are placed on nodes that have both sufficient computational resources and access to network transport capabilities needed to support the pod's networking requirements, improving deployment reliability and preventing resource-related failures in container environments.

21 Claims, 6 Drawing Sheets

SYSTEMS AND METHODS FOR NETWORK-AWARE CONTAINER ORCHESTRATION WITH TRANSPORT RESOURCE OPTIMIZATION

BACKGROUND

Container orchestration systems (e.g., Kubernetes®) have become important components of modern cloud infrastructure, enabling automated deployment, scaling, and management of containerized applications. These systems typically make pod placement decisions based on computational resource availability such as compute, memory, and storage capacity of worker nodes.

DETAILED DESCRIPTION

Figure 1:
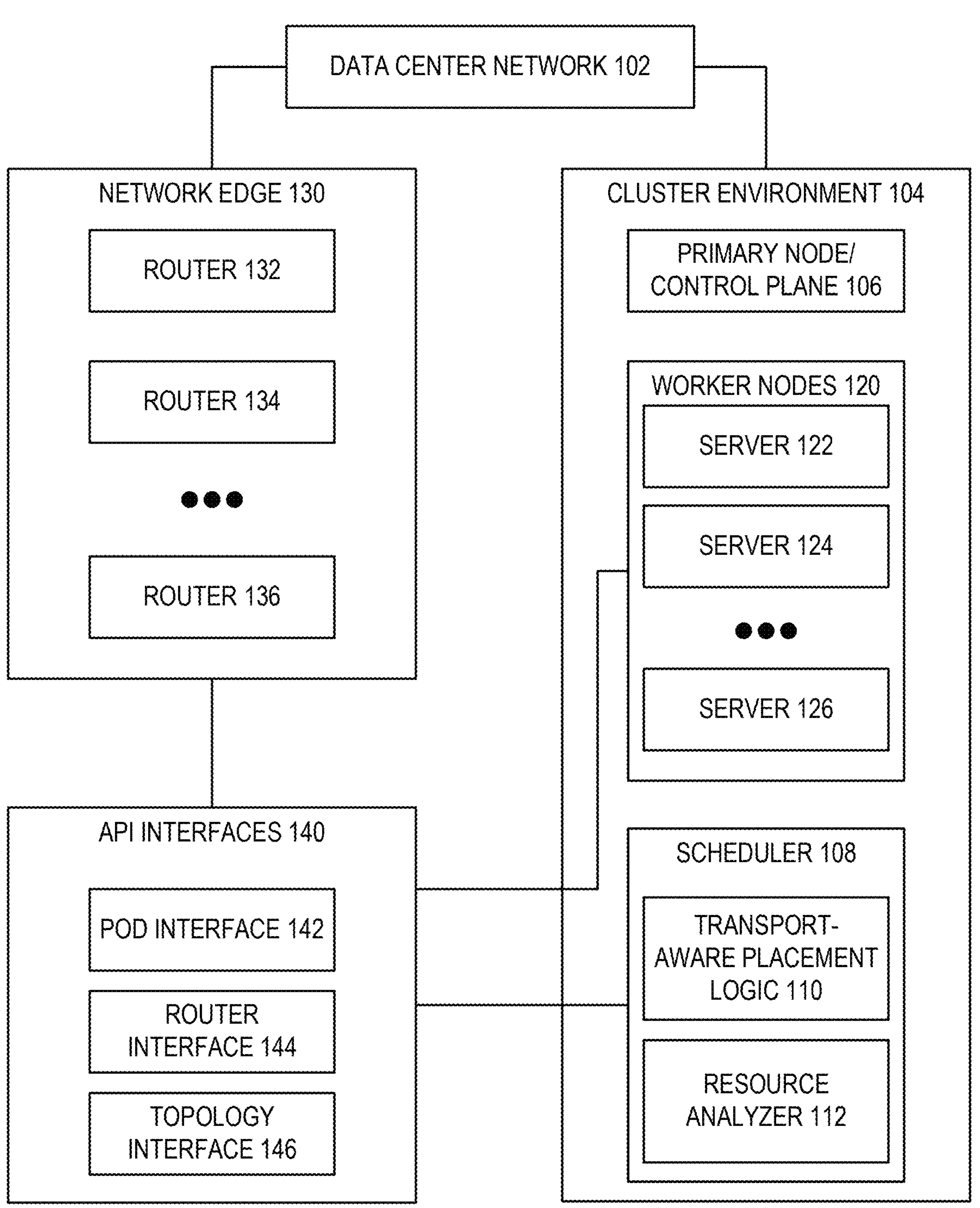
FIG. 1 is a block diagram illustrating a transport-aware container orchestration system according to some of the disclosed embodiments.

In traditional container orchestration environments, pods can specify their computational resource requirements through resource requests and limits. Pods can also define scheduling constraints through node selectors, affinity rules, and taints/tolerations. A container orchestration system scheduler can then use these specifications to find suitable nodes for pod placement while maintaining efficient resource utilization across the cluster.

Default container orchestration system networking models provide basic connectivity between pods, allowing them to communicate regardless of their physical location within the cluster. This is typically implemented through overlay networks or similar networking solutions that abstract the underlying network infrastructure. Network plugins extend this basic functionality by implementing the Container Network Interface (CNI) specification to provide additional networking capabilities.

Network function virtualization (NFV) and cloud-native network functions (CNF) have driven the adoption of containerized networking applications. These applications often require specific network protocol support such as BGP (Border Gateway Protocol), OSPF (Open Shortest Path First), or BFD (Bidirectional Forwarding Detection) to operate effectively. They may also need to interact with physical network infrastructure components like routers and switches.

Despite their deployment in networked systems, existing container orchestration systems primarily focus on computational resource management and only basic network connectivity. By contrast, they typically do not consider the availability or capacity of network transport resources when making pod placement decisions. This can lead to suboptimal placement of pods with specific networking requirements, potentially impacting application performance and reliability.

Further, container orchestration systems face a technical limitation in pod scheduling when containers require specific network transport protocols and resources. The standard scheduler lacks visibility into router resource utilization, protocol support capabilities, and network topology. When a pod requires specific transport protocols like BGP or BFD, the scheduler may place it on a worker node connected to a router that either lacks support for these protocols or has insufficient capacity to handle additional protocol sessions. This technical limitation can result in pod initialization failures or degraded network performance since the placement decision occurs without knowledge of the actual network transport resources available at different points in the network topology. Furthermore, the absence of a standardized mechanism for pods to declare their network transport requirements means that even if router resource information were available, current schedulers have no way to match these requirements against available capabilities.

The disclosed embodiments solve these technical problems by implementing a transport-aware scheduling system that extends a container orchestration platform's control plane. The disclosed embodiments introduce new application programming interfaces that enable routers to report their protocol support capabilities, current resource utilization, and session capacity through standardized metrics. A topology discovery mechanism using Link Layer Discovery Protocol (LLDP) (or similar protocols) creates a mapping between worker nodes and their connected routers, providing the scheduler with a complete view of the network topology. The pod specification format is extended with new fields that allow containers to declare their specific protocol requirements and expected resource utilization, such as the number of BGP sessions or route advertisements. The scheduler component incorporates this information through new filtering algorithms that evaluate both computational and network transport resources when selecting candidate nodes, ensuring pods are placed only on nodes with access to routers that can support their declared protocol requirements and have sufficient capacity for additional sessions.

The disclosed embodiments include methods for transport-aware container orchestration. A processor receives a pod deployment request that includes specific network transport requirements such as protocol support needs and route advertisement estimates. The processor obtains router resource data from multiple routers in the container orchestration environment, where this data indicates current protocol support capabilities and resource utilization levels. The processor also retrieves topology mapping data that shows the connections between worker nodes and routers, which may be discovered through link layer discovery protocols. Using this information, the processor filters available worker nodes based on both the router resource data and topology mapping to identify candidate nodes that have access to router resources matching the pod's network transport requirements. The processor then selects an optimal node from these candidates based on computational resource availability and affinity rules. The router resource data is obtained through a monitoring process that collects protocol statistics, resource utilization metrics, and alarm status information from each router, formatting this data into a standardized format for transmission to the cluster application programming interface (API). The topology mapping involves enabling discovery protocols on worker nodes, discovering and validating router connections, and maintaining this information in a topology database. The selection of the optimal node considers both computational resource availability and network transport resources to ensure proper pod placement.

FIG. 1 is a block diagram illustrating a transport-aware container orchestration system according to some of the disclosed embodiments.

In the illustrated embodiment, a data center network 102 can include a cluster environment 104 (e.g., a Kubernetes® environment or other container orchestration system) and network edge components 130. The data center network 102 can provide the network infrastructure that enables communication between all system components. In some implementations, the data center network 102 may comprise multiple network segments, redundant paths, and various networking technologies to ensure reliable and high-performance connectivity. The data center network 102 may implement software-defined networking (SDN) capabilities to provide flexible network management and policy enforcement.

The cluster environment 104 includes a primary node/control plane 106 which can manage the overall container orchestration operations. As illustrated, the primary node 106 can include a scheduler 108 that can include two subcomponents: transport-aware placement logic 110 and a resource analyzer 112. In some implementations, the scheduler 108 can be responsible for determining optimal pod placement while considering both computational and network transport resources. In some implementations, the scheduler 108 may operate as an extension to the default container orchestration system scheduler, intercepting pod placement requests and augmenting the standard scheduling decisions with transport-aware placement logic.

The transport-aware placement logic 110 can implement scheduling algorithms (described below) that consider network transport requirements alongside traditional computing resources. In some implementations, transport-aware placement logic 110 may implement weighted scoring mechanisms to balance various factors such as CPU utilization, memory availability, network transport capacity, and topology constraints. The transport-aware placement logic 110 may also implement predictive capabilities to anticipate resource needs and avoid potential resource conflicts or bottlenecks.

Working in conjunction with the placement logic, resource analyzer 112 can maintain a view of the cluster's resource landscape. In some implementations, the resource analyzer 112 may implement analysis techniques to process resource metrics, detect trends, and identify potential resource constraints before they impact application performance. The resource analyzer 112 may also implement caching mechanisms to maintain rapid access to resource status information while minimizing the load on the router reporting system.

The cluster environment 104 further includes a set of worker nodes 120, which comprise the physical or virtual machines where containers are ultimately deployed. In the illustrated implementation, the worker nodes 120 include multiple servers (server 122, server 124, server 126) that can host containerized applications. These servers may be organized into racks or other physical groupings, with each group typically sharing common network edge resources. In some implementations, the worker nodes may implement local agents that monitor and report resource utilization, maintain network topology information, and enforce placement decisions made by the scheduler.

The network edge 130 includes multiple routers (router 132, router 134, router 136) that can facilitate network connectivity and routing services for the applications deployed within the cluster. These routers can provide transport layer services such as BGP routing, BFD monitoring, and OSPF routing, among others. In a typical deployment, the cluster may comprise multiple racks (e.g., five racks) with a pair of routers physically located at the top of each rack, providing redundant connectivity for a specific subset of the worker nodes 120. This rack-based architecture means that a typical cluster deployment may involve ten or more router devices reporting metrics. The routers may implement various routing protocols and features, with each router maintaining its own routing tables, protocol states, and resource pools. This physical topology can sometimes lead to situations where network-intensive applications become clustered on servers within a single rack, potentially overwhelming the associated top-of-rack routers while leaving other rack routers underutilized.

In conventional deployments, many containerized applications utilize a default software-defined load balancer for their network connectivity needs. These applications typically have a basic network interface (e.g., eth0) and rely on the load balancer for ingress and egress traffic. However, specialized applications, particularly those implementing network functions, may require multiple network interfaces and direct protocol support from the routers, bypassing the standard load balancer architecture. These applications' unique requirements make them particularly sensitive to router placement and capacity, driving the need for transport-aware scheduling.

A set of API interfaces 140 can facilitate communication between the various system components. The API interfaces include a pod interface 142, which can handle pod deployment requests and specifications including the newly defined transport requirements. In some implementations, the pod interface 142 may implement validation logic to ensure that transport requirements are properly specified and fall within acceptable ranges. The pod interface 142 may also implement versioning support to enable backward compatibility as the transport requirement specifications evolve.

The router interface 144 can allow routers to report their current resource utilization and capabilities to the cluster. This interface may implement various reporting mechanisms, including push-based updates for changes and periodic polling for routine status updates. The interface can be adapted to different router vendors' varying levels of API support, with some vendors offering basic configuration APIs while others provide more programmatic control. The interface can implement a vendor-neutral abstraction layer that normalizes these varying API capabilities into a consistent interface for the cluster. Security can be maintained through mutual TLS authentication between routers and the cluster API, with role-based access control defining permitted metric reporting operations. In some implementations, the router interface 144 may implement compression and aggregation techniques to efficiently handle large volumes of metric data from multiple routers.

The topology interface 146 can manage the mapping between worker nodes and their associated routers, which may be discovered through protocols such as LLDP or similar mechanisms. When using LLDP, the interface can implement extensions to the standard Type-Length-Value (TLV) parameters to capture additional metadata about router capabilities and supported features. In environments where LLDP is not available or permitted, the interface can support alternative discovery mechanisms including static configuration files, API-based topology discovery, or custom discovery protocols. In some implementations, the interface can implement a multi-stage validation process for topology changes, including verification of bidirectional connectivity, authentication of discovered devices against an authorized inventory, and correlation of reported capabilities with known router specifications. In some implementations, the topology interface 146 may implement caching and validation mechanisms to ensure topology information remains accurate and quickly accessible. The interface may also support manual topology configuration for environments where automatic discovery is not feasible or desired.

In some implementations, the primary node 106 can communicate with the worker nodes 120 to manage container deployment and lifecycle operations. This communication path can enable the primary node to monitor node health, transmit placement decisions, and manage the overall state of the cluster. The network edge 130 and worker nodes 120 can both interface with the API interfaces 140, which in turn can provide information to the scheduler 108. This information flow enables the transport-aware placement logic 110 to make decisions about pod placement while considering both computational resources and network transport capabilities.

This architecture represents an enhancement to traditional container orchestration system scheduling by incorporating network transport awareness into the pod placement decision process. By maintaining a real-time view of both computational and network transport resources, the system can optimize pod placement to prevent resource exhaustion and ensure optimal application performance. The separation of concerns between the various interfaces (pod, router, and topology) provides a modular and extensible framework that can accommodate future enhancements and additional resource types. The system is particularly useful in environments where applications have specific network transport requirements, such as those using BGP for routing or BFD for link monitoring. By considering these requirements during the placement process, the system can prevent situations where pods might otherwise be scheduled on nodes with insufficient network transport resources, leading to application failures or degraded performance. The architecture's modular design also enables future extensions to support additional network protocols, resource types, and scheduling algorithms as requirements evolve. The following flow diagram describes various functional processes performing the above-described environment in more detail.

Figure 2:
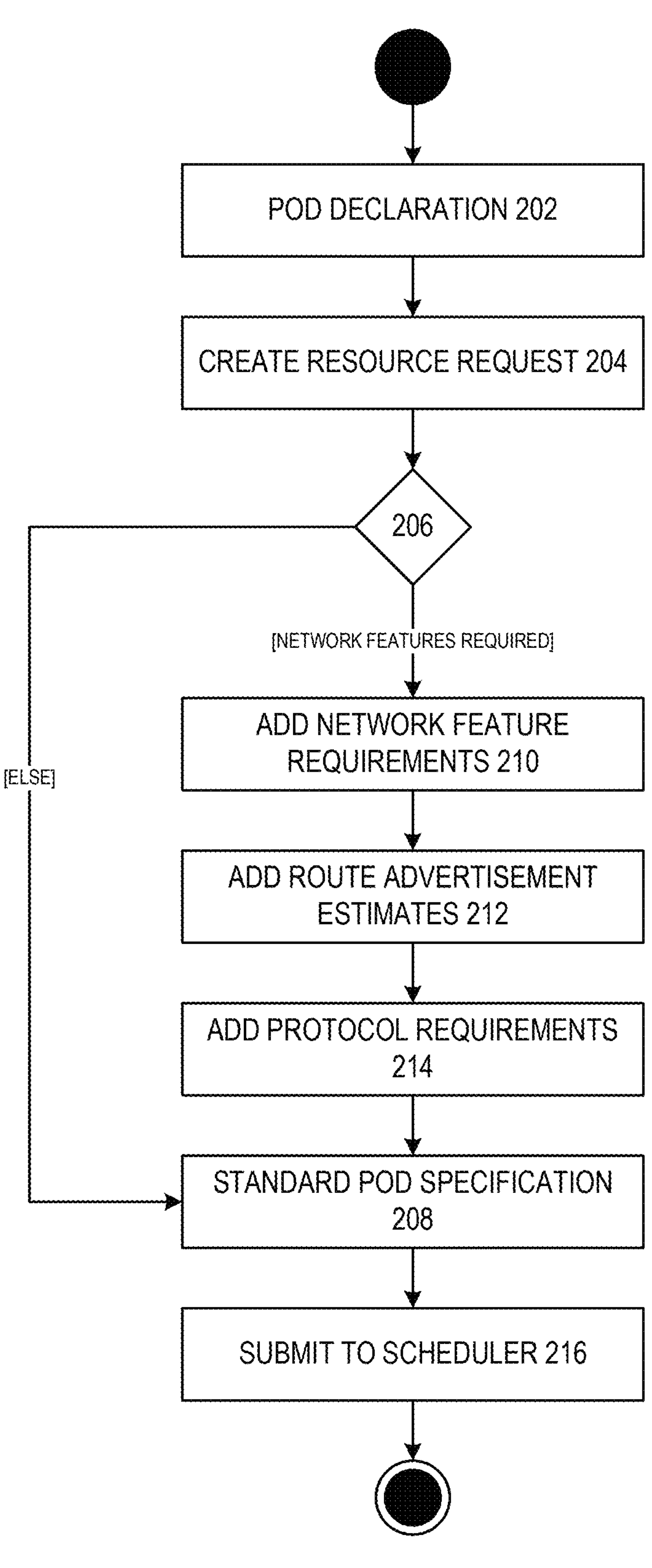
FIG. 2 is a flow diagram illustrating a method for declaring pods with network transport requirements according to some of the disclosed embodiments.

FIG. 2 is a flow diagram illustrating a method for declaring pods with network transport requirements according to some of the disclosed embodiments.

In step 202, the method can include initiating a pod declaration. During this step, an operator or automated system begins the process of defining a new pod for deployment within the container orchestration system (e.g., Kubernetes®) cluster environment. The pod declaration may originate through various interfaces such as the container orchestration system API, command-line tools, or infrastructure-as-code templates. This initial declaration serves as the foundation for specifying the complete set of requirements and characteristics that will govern the pod's deployment and operation within the cluster.

In step 204, the method can include creating a resource request specification. The resource request can include the computing requirements that the pod will need to operate within the cluster environment. These specifications can include parameters such as CPU allocation, memory requirements, ephemeral storage needs, and any specialized hardware requirements the pod may have. The resource request may also incorporate quality-of-service designations that influence how the pod's resources are guaranteed and managed by the underlying system.

In step 206, the method determines whether network features are required for the pod deployment. In this step, the method improves upon existing pod specification processes, as it introduces the consideration of network transport requirements into the pod deployment process. The determination may be based on the intended function of the pod, its role within the broader application architecture, or specific requirements of the containerized applications it will host. For instance, a pod implementing network functions virtualization might require specific protocol support, whereas a basic web application pod might operate with standard network configurations.

If network features are not required, the method proceeds to step 208, where a standard pod specification can be created. The standard specification can incorporate the basic resource requirements defined in step 204 and can include standard networking parameters such as port definitions and basic network policies. This path maintains compatibility with traditional pod deployment workflows while allowing for the enhanced capabilities when needed.

However, if network features are required, the method proceeds to step 210, where network feature requirements can be incorporated into the pod specification. This step represents an enhancement to existing pod specifications by introducing network transport requirements. The network feature requirements may encompass protocol support needs, bandwidth specifications, quality-of-service parameters, and specific network interface requirements, as discussed in more detail herein. These requirements can be encoded using custom resource definitions that extend the existing specification formats while maintaining compatibility with existing cluster management tools.

In step 212, the method can include adding route advertisement estimates to the specification. This step can be used for pods that will participate in dynamic routing protocols within the cluster network. The route advertisement estimates can provide the scheduler with information about the expected impact on router resources. These estimates may include the anticipated number of routes, expected update frequencies, and stability parameters. The scheduler uses this information to evaluate the impact on router resources and make appropriate placement decisions that ensure optimal resource utilization across the cluster.

In step 214, the method can proceed to add specific protocol requirements to the pod specification. This step can include a more detailed specification of the network protocols required by the pod and their associated configuration parameters. For BGP implementations, this might include session requirements, timer configurations, and authentication parameters. OSPF specifications might encompass area assignments, timer settings, and network type designations. BFD requirements could include session parameters, timer configurations, and authentication needs. These protocol-specific requirements enable the scheduler to evaluate the pod's networking needs against available router capabilities and current resource utilization.

The method then proceeds to step 208, where all the network transport requirements can be merged into the complete pod specification. This step can thus create a specification that combines both traditional computing resources and the newly defined network transport requirements into a single, coherent declaration. The resulting specification provides the scheduler with all necessary information to make informed placement decisions that consider both computational and network transport resources (as will be discussed).

In step 216, the method can include submitting the final pod specification to the scheduler. During this step, the complete specification can undergo various validation processes to ensure its correctness and compatibility with the cluster environment. The submission process can verify the format and required fields, validate resource requirement values against cluster-defined limits, and ensure compliance with any defined policies or constraints. The scheduler receives this validated specification and uses it to make optimal placement decisions that consider both computational and network transport requirements.

As illustrated, the method represents an advancement in container orchestration by incorporating network transport awareness into the pod specification process. By providing detailed information about network protocol requirements, route advertisements, and other network-specific needs, the method can allow the scheduler to make more intelligent placement decisions that consider both computational and network resources. This approach to resource specification helps prevent situations where pods might be placed on nodes with insufficient network transport resources, leading to improved application reliability and performance.

The pod declaration method may incorporate additional processing steps to improve accuracy and reliability. The protocol requirements may be automatically determined by analyzing the container application's configuration files and runtime requirements. Route advertisement estimates can be calculated using historical data from similar applications or through static analysis of the application's routing configuration. The method may implement a validation framework that checks the declared transport requirements against cluster-wide policies and resource limits. When no transport requirements are specified, the method may apply default parameters based on the application type and historical deployment patterns.

The method's approach to gathering and specifying network transport requirements enables more predictable and reliable application deployment within container orchestration system clusters. By considering both computational and network resources during the specification phase, the method helps ensure that pods are placed on nodes with appropriate resources to support their network requirements. This preemptive consideration of network transport resources can significantly reduce deployment failures and performance issues that might otherwise occur when network resource constraints are discovered only after pod placement.

The enhanced pod specification process also provides useful information for capacity planning and resource management within the cluster. The detailed network transport requirements captured by this method enable cluster administrators to better understand and predict network resource utilization patterns. This information can be used to optimize cluster resources, plan capacity expansions, and identify potential bottlenecks before they impact application performance. The systematic capture of network transport requirements also facilitates better documentation and understanding of application networking needs, which can be useful for troubleshooting and maintenance activities.

Figure 3:
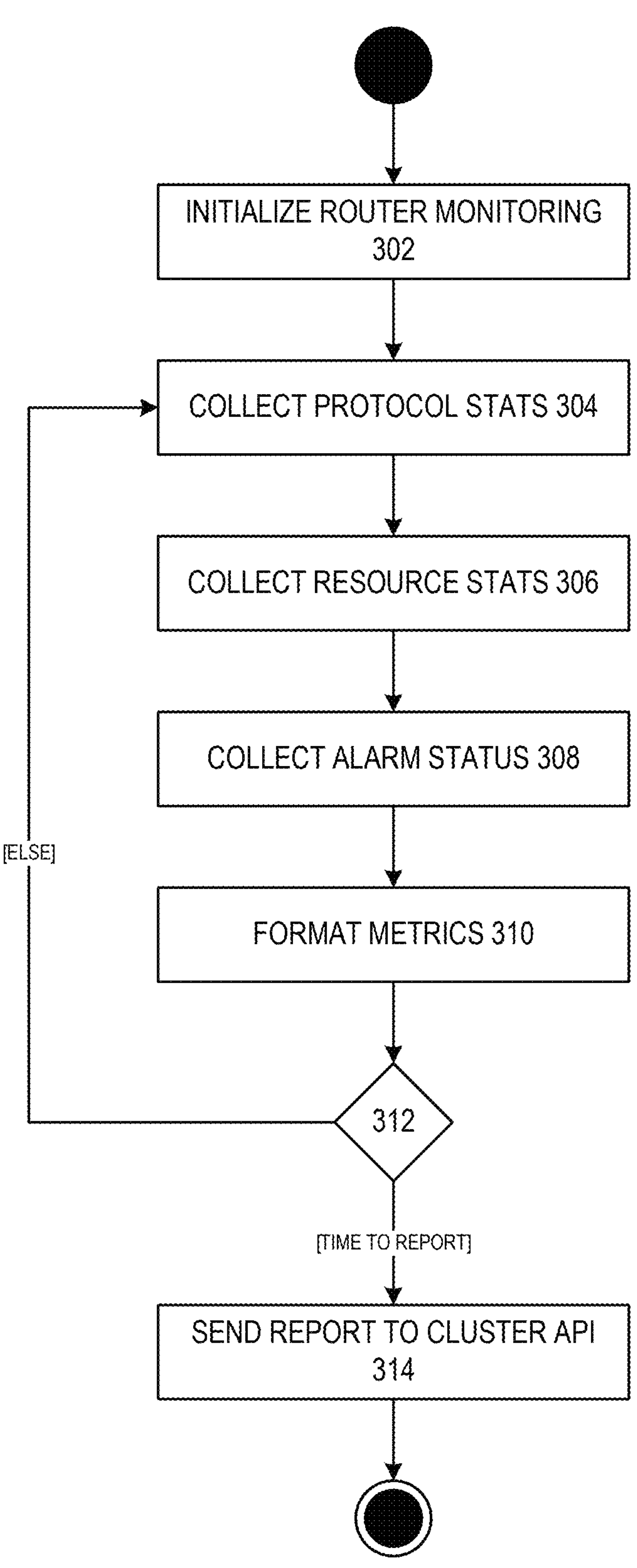
FIG. 3 is a flow diagram illustrating a method for monitoring and reporting router resources according to some of the disclosed embodiments.

FIG. 3 is a flow diagram illustrating a method for monitoring and reporting router resources according to some of the disclosed embodiments.

In step 302, the method can include initializing router monitoring. During this initialization phase, the router can establish the necessary monitoring processes and connections required to report its status to the container orchestration system cluster. The initialization process can configure various monitoring parameters such as sampling intervals, metric thresholds, and reporting frequencies. The router can also establish a secure connection to the cluster's API endpoint, ensuring that all subsequent metric reporting occurs over an authenticated and encrypted channel. This initialization step may also involve loading any router-specific configurations that define which metrics should be collected and how they should be processed.

In step 304, the method can include collecting protocol statistics. During this step, the router can query its internal state to gather detailed information about the various network protocols it is currently supporting. For example, for BGP protocol statistics, the router can examine the current number of established neighbor sessions, the total number of routes being advertised and received, and the stability metrics of these sessions. As another example, for OSPF protocol monitoring, the router can store information about area configurations, the number of active neighbors, and the current link state database size. As another example, BFD protocol statistics can include the number of active sessions, their current state, and any timing parameters that might impact resource utilization.

In step 306, the method can include collecting resource statistics from the router. This step can include gathering detailed metrics about the router's current resource utilization state. The router can monitor its CPU utilization across different processes and cores, memory allocation and availability, and buffer utilization statistics. The resource collection process can also monitor the router's forwarding plane resources, including forwarding table utilization, queue depths, and packet processing statistics. These resource statistics provide information about the router's current capacity to support additional network protocols and sessions.

In step 308, the method can include collecting alarm status information. During this step, the router can analyze its current alarm state and gathers information about any active or recently cleared alarms that might impact its ability to support network protocols. The alarm collection process can analyze various categories of alarms including hardware failures, software issues, protocol problems, and resource exhaustion warnings. This alarm status information provides important context about the router's health and its ability to reliably support additional network requirements.

In step 310, the method can include formatting the collected metrics into a standardized structure suitable for transmission to the container cluster. This formatting process can transform the raw metric data into a well-defined schema that can be efficiently processed by the cluster's resource analyzer component. During this step, the router may perform initial processing on the raw metrics such as calculating moving averages, identifying trends, or computing derivative metrics that provide additional insight into resource utilization patterns. The formatting process can ensure that all metrics are properly timestamped and include any necessary context about their collection parameters.

In step 312, the method can include determining whether it is time to report the collected metrics to the cluster. This step can include implementing a configurable reporting interval that balances the need for current resource information against the overhead of frequent metric transmission. The reporting interval may be predetermined and/or dynamically adjusted based on factors such as the current resource utilization levels, the presence of critical alarms, or specific requests from the cluster for more frequent updates. If it is not time to report, the method returns to step 304 to continue collecting updated metrics.

If it is time to report, the method proceeds to step 314, where the formatted metrics can be transmitted to the cluster API. During this step, the router can establish a connection to the cluster's router interface and transmit a set of formatted metrics. The transmission process includes error handling and retry logic to ensure reliable delivery of the metric data. The router may also implement bandwidth-efficient transmission techniques such as delta encoding or compression to minimize the network overhead of metric reporting.

The router monitoring method collects detailed protocol-specific metrics to enable precise resource tracking. For BGP, the metrics can include the number of configured neighbors, established sessions, total routes per address family, update message rates, and session stability indicators. OSPF metrics can encompass area configurations, link state advertisement counts, database sizes, and neighbor states. BFD monitoring can track session counts, timer configurations, and state changes. The method can also monitor protocol-specific CPU utilization, memory allocation patterns across different protocol features, and network buffer utilization. In some implementations, the metric transmission process can implement retry logic with exponential backoff and circuit breaking to handle network issues while maintaining data consistency.

The illustrated method provides an approach to monitoring and reporting router resources within a containerized cluster environment. By continuously collecting and reporting detailed protocol and resource metrics, the method enables the cluster scheduler to make informed decisions about pod placement that consider current network transport capabilities. The systematic collection of protocol statistics, resource metrics, and alarm status information provides a complete view of router health and capacity.

In some implementations, the continuous nature of the method allows the cluster to maintain an up-to-date view of available network transport resources. This real-time resource visibility allows the scheduler to make better-informed placement decisions and helps prevent resource exhaustion scenarios that could impact application performance. The inclusion of alarm status information also enables the cluster to proactively avoid placing pods on routers that may be experiencing hardware or software issues, further improving overall system reliability.

Figure 4:
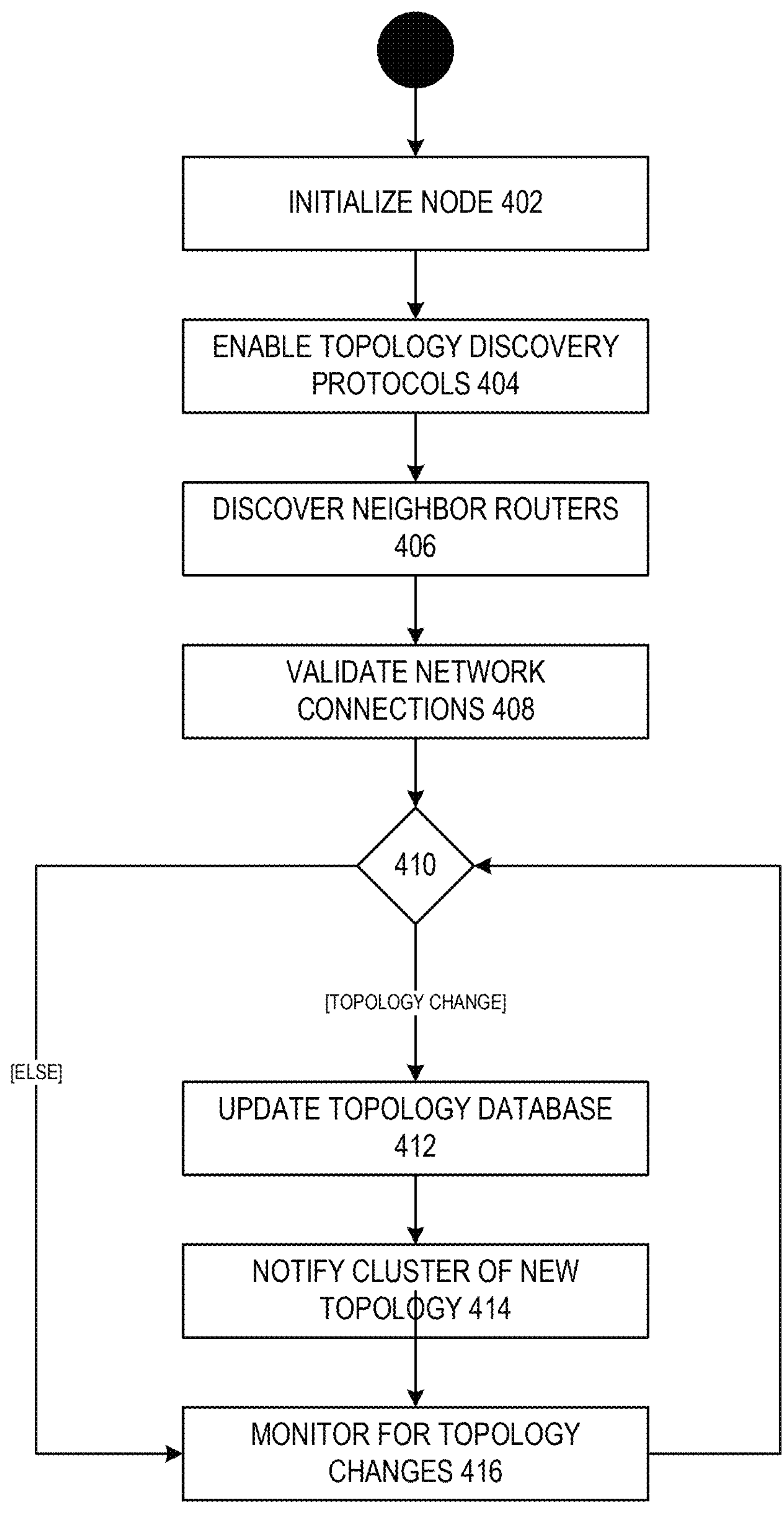
FIG. 4 is a flow diagram illustrating a method for discovering and maintaining network topology information according to some of the disclosed embodiments.

FIG. 4 is a flow diagram illustrating a method for discovering and maintaining network topology information according to some of the disclosed embodiments.

In step 402, the method can include initializing a worker node within the containerized cluster environment. During this initialization phase, the node can establish its basic networking configuration and prepares for topology discovery. The initialization process can configure network interfaces, establish basic connectivity, and load any node-specific configurations that will guide the topology discovery process. The node also can establish the necessary connections to the cluster's topology interface, ensuring it can report discovered topology information through the appropriate channels.

In step 404, the method can include enabling topology discovery protocols on the node. During this step, the node can activate either the LLDP or a similar discovery protocol designed specifically for the cluster environment. When using LLDP, the node can configure appropriate timer values, enable the protocol on relevant interfaces, and initialize the protocol state machine. The protocol configuration includes parameters such as transmission intervals, predetermined intervals, hold times, and the specific set of TLV parameters that should be advertised and processed. Custom discovery protocols may require additional configuration specific to the cluster's networking architecture.

In step 406, the method can include discovering neighbor routers through the enabled discovery protocol. During this discovery phase, the node can start sending and receiving discovery protocol messages with its directly connected network devices. The node can process received protocol messages to build a list of neighboring routers and their capabilities. The discovery process captures information about each neighbor including its identity, capabilities, and the specific interfaces through which the connection is established.

In step 408, the method can include validating the discovered network connections. During this validation phase, the node can perform additional checks to verify the authenticity and reliability of the discovered neighbor relationships. The validation process may include checking protocol authentication, verifying bidirectional connectivity, and confirming that discovered neighbors are authorized members of the cluster network. The node may also perform capability negotiation with discovered neighbors to ensure compatible feature support.

In step 410, the method can include determining whether the network topology has changed based on the latest discovery and validation results. In this step, the method can include comparing the currently discovered topology against the previously known state to identify any changes. Changes might include the discovery of new neighbors, the loss of previously known neighbors, or modifications to neighbor capabilities or connectivity parameters. The comparison process can consider both the physical connectivity and the logical relationships between network elements.

If no topology changes are detected, the method proceeds to step 416, where it can continue monitoring for future topology changes. During this monitoring phase, the node can maintain active protocol sessions with its neighbors and processes any incoming protocol messages that might indicate topology changes. The monitoring process can run continuously, ensuring that the node maintains an accurate view of its network connectivity.

If topology changes are detected, the method proceeds to step 412, where the topology database can be updated to reflect the new network state. During this update process, the node can modify its internal representation of the network topology to accurately reflect the discovered changes. The database update can include recording the specific nature of the topology changes, timestamps of when the changes were detected, and any relevant context about the change events.

In step 414, the method proceeds to notify the cluster about the topology changes through the topology interface. The notification process can include formatting the topology changes into a standardized message format and transmitting this information to the cluster's control plane. The notification can include detailed information about the nature of the topology changes, enabling the cluster scheduler to adjust its placement decisions based on the updated network connectivity information. The notification process may also include acknowledgment mechanisms to ensure reliable delivery of topology updates.

In some implementations, the topology discovery method can utilize extended LLDP TLV parameters to exchange detailed capability information between nodes and routers.

The neighbor authentication process validates discovered devices against a trusted inventory database and verifies cryptographic identities. Bidirectional connectivity validation can ensure symmetric routing capabilities between nodes and routers. The capability negotiation process can establish supported protocols, timer ranges, and resource limits. Topology change detection implements a state machine that tracks both physical connectivity and logical capability modifications. Database updates use transaction semantics to maintain consistency during concurrent topology changes.

This method provides a robust approach to maintaining accurate network topology information within a containerized cluster environment. By continuously monitoring and validating network connectivity, the method ensures that the cluster maintains an accurate understanding of the relationship between worker nodes and their associated network resources. This topology awareness is useful for making informed pod placement decisions that consider network transport requirements and available resources.

The method's use of discovery protocols like LLDP, combined with custom validation and monitoring processes, provides a reliable foundation for topology discovery and maintenance. The continuous monitoring and immediate notification of topology changes enables the cluster to quickly adapt to network changes, ensuring that pod placement decisions remain optimal even as the network evolves. The systematic approach to topology discovery and validation helps prevent misconfigurations and ensures that the cluster maintains accurate information about available network transport resources.

The topology discovery and maintenance process implemented by this method plays a role in enabling transport-aware pod placement within the cluster. By maintaining accurate information about the connections between worker nodes and network resources, the method enables the scheduler to make placement decisions that consider both the computational requirements of pods and their network transport needs. This approach to resource awareness helps ensure optimal application performance and reliable network operations within the cluster environment.

Figure 5:
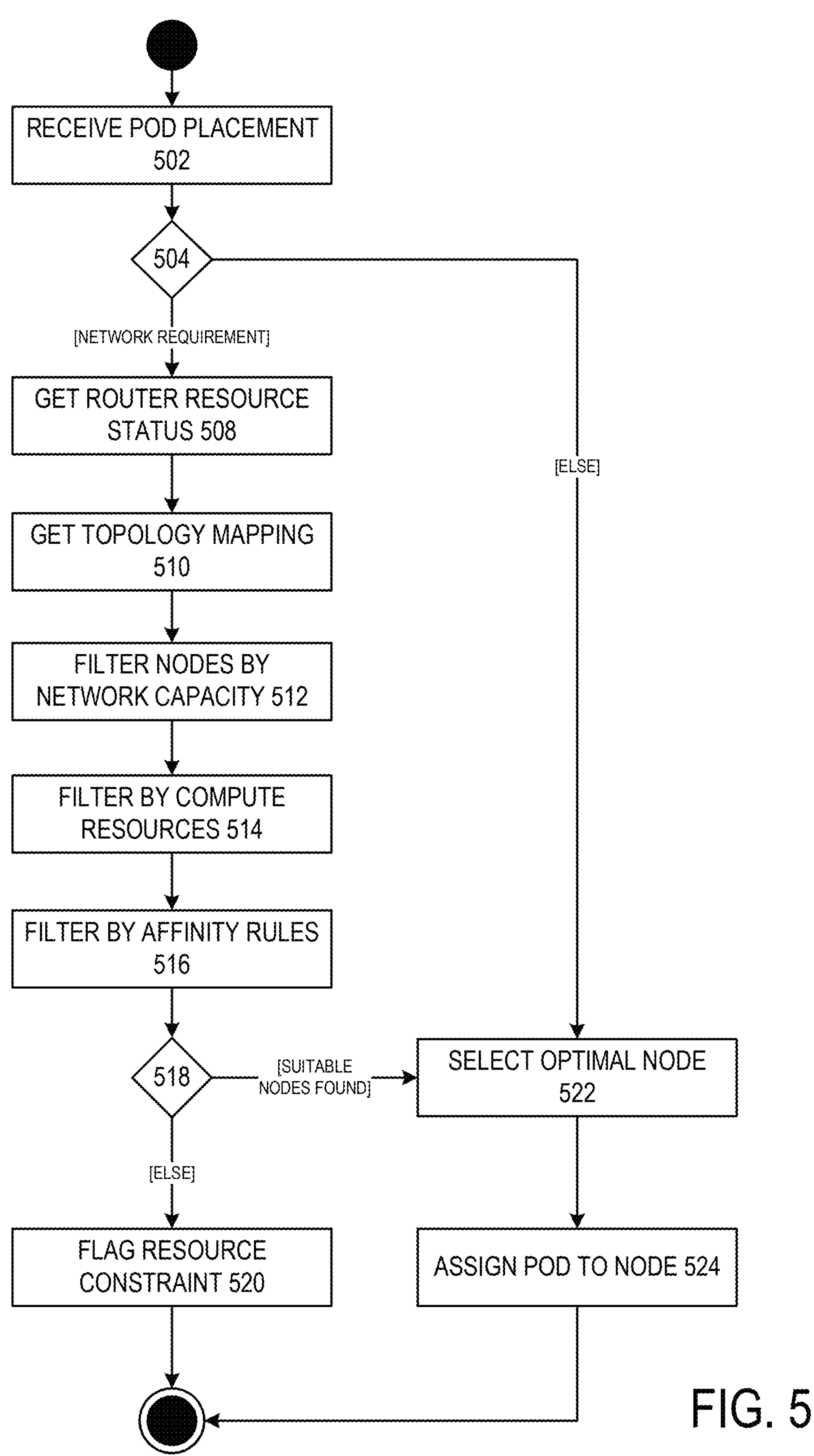
FIG. 5 is a flow diagram illustrating a method for transport-aware pod placement according to some of the disclosed embodiments.

FIG. 5 is a flow diagram illustrating a method for transport-aware pod placement according to some of the disclosed embodiments.

In step 502, the method can include receiving a pod placement request through the cluster's scheduler interface. During this initial phase, the scheduler component can receive a complete pod specification that includes both traditional resource requirements and any specified network transport requirements. The placement request can contain the set of constraints and preferences that will guide the pod placement decision. The scheduler begins processing this request by parsing the specification and preparing for the multi-stage filtering process that will determine the optimal node placement.

In step 504, the method can include determining if the pod specification includes specific network transport requirements. In this step, the method can analyze the pod specification for any declared network protocol requirements, route advertisement estimates, or other network-specific constraints. The presence of network requirements triggers an enhanced placement process that considers both computational and network transport resources during node selection.

If no network requirements are specified, the method can apply standard container orchestration system placement logic and proceed to step 522. As discussed, the standard placement process considers traditional resource requirements such as CPU, memory, and storage, along with any basic network configuration needs. This path maintains compatibility with conventional pod deployments while allowing for enhanced placement logic when needed.

If network requirements are present, the method can proceed to step 508, where the scheduler can retrieve the current resource status from all routers in the cluster. During this step, the scheduler can query the router interface to obtain the latest metrics regarding protocol support, resource utilization, and alarm status from each router. These metrics can provide a current snapshot of available network transport resources across the cluster. The retrieved status information can include detailed protocol statistics, resource utilization levels, and any active alarms that might impact placement decisions.

In step 510, the method can include retrieving the current topology mapping from the topology interface. This step can provide the scheduler with information about the physical and logical relationships between worker nodes and their associated routers. The topology mapping can enable the scheduler to understand which nodes can access specific network transport resources. This information is useful for ensuring that pods are placed on nodes with appropriate network connectivity to support their requirements.

In step 512, the method can include filtering available nodes based on network transport capacity. During this filtering phase, the scheduler can evaluate each node's associated router resources against the pod's declared network requirements. Nodes can be eliminated from consideration if their associated routers lack sufficient capacity to support the pod's protocol requirements or route advertisement estimates. This initial filtering can ensure that subsequent placement decisions only consider nodes with adequate network transport resources.

In step 514, the method can include filtering the remaining nodes based on computational resource availability. This step can analyze traditional resource requirements such as CPU, memory, and storage against each node's current capacity. The filtering process can consider both the pod's resource requests and any resource limits specified in the pod definition. Nodes without sufficient computational resources can be removed from the candidate pool.

In step 516, the method can include applying affinity rule filtering to the remaining candidate nodes. This step can include considering any pod affinity or anti-affinity rules specified in the pod definition. These rules might require or prevent co-location with other pods based on label selectors or node characteristics. The affinity filtering ensures that the final placement decision respects all specified scheduling constraints.

In step 518, the method can include determining whether any suitable nodes remain after all filtering stages. This step can include evaluating if there are any nodes in the candidate pool that satisfy all placement requirements. The evaluation can consider both hard constraints that must be satisfied and soft preferences that influence the final selection.

If no suitable nodes are found, the method can proceed to step 520, where a resource constraint can be flagged. This step can include recording the specific constraints that could not be satisfied and may trigger cluster auto-scaling or alert cluster administrators about resource shortages. The constraint flag provides feedback for capacity planning and resource management.

If suitable nodes are available, the method can proceed to step 522, where the optimal node is selected from the remaining candidates. The selection process can consider various factors including resource utilization balance, network topology optimization, and any specified scheduling preferences. The scheduler may implement scoring algorithms to rank candidate nodes and select the most appropriate placement.

Finally, in step 524, the method can include assigning the pod to the selected node. During this step, the scheduler can update its internal state and communicates the placement decision to the cluster's control plane. The assignment process includes updating relevant databases and initiating the pod creation process on the selected node. This final step completes the placement decision and begins the actual pod deployment process.

In some implementations, the placement method can implement a scoring algorithm that considers both immediate resource requirements and historical utilization patterns. The scoring combines weighted factors including protocol support matches, resource headroom, topology optimization, and load distribution across router pairs. The method includes conflict resolution logic for scenarios where multiple pods compete for limited transport resources. Resource constraint violations trigger graduated responses including placement delays, resource preemption, or cluster scaling recommendations. Failed placements invoke a rollback procedure that restores the system to a consistent state. The method maintains detailed records of placement decisions to inform future scheduling improvements and capacity planning.

The above method represents an advancement in container orchestration by implementing an approach to pod placement that considers both computational and network transport resources. The systematic filtering process ensures that pods are placed on nodes with appropriate resources to support their complete set of requirements. The method's consideration of network topology and router resources enables more reliable application deployment and helps prevent resource-related failures that might occur with traditional placement approaches.

Figure 6:
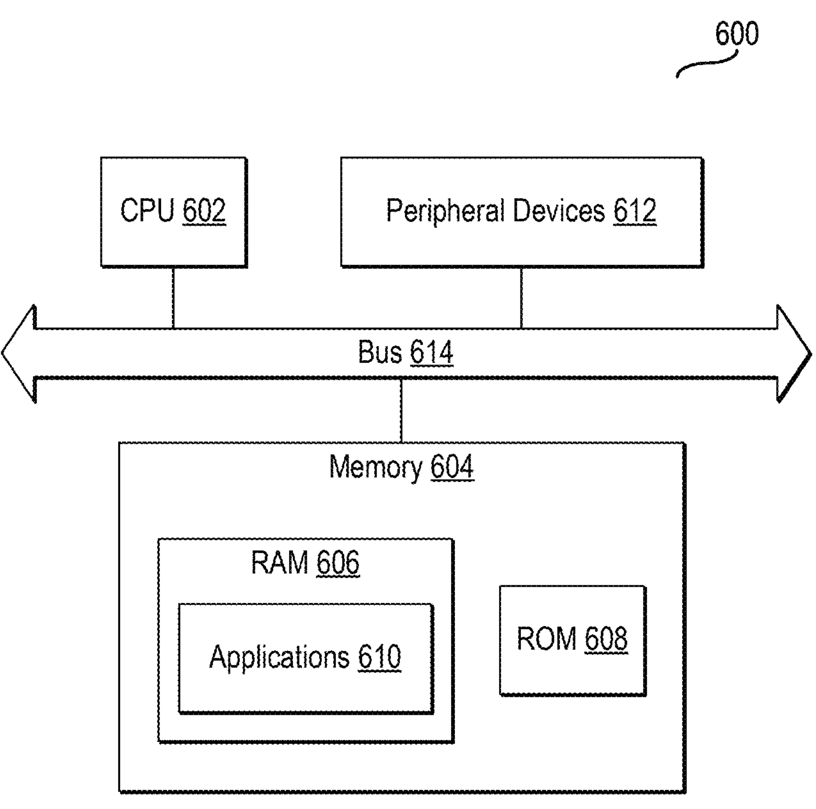
FIG. 6 is a block diagram of a computing device according to some embodiments of the disclosure.

FIG. 6 is a block diagram of a computing device according to some embodiments of the disclosure.

As illustrated, the device 600 includes a processor or central processing unit (CPU) such as CPU 602 in communication with a memory 604 via a bus 614. The device also includes one or more input/output (I/O) or peripheral devices 612. Examples of peripheral devices include, but are not limited to, network interfaces, audio interfaces, display devices, keypads, mice, keyboard, touch screens, illuminators, haptic interfaces, global positioning system (GPS) receivers, cameras, or other optical, thermal, or electromagnetic sensors.

In some embodiments, the CPU 602 may comprise a general-purpose CPU. The CPU 602 may comprise a single-core or multiple-core CPU. The CPU 602 may comprise a system-on-a-chip (SoC) or a similar embedded system. In some embodiments, a graphics processing unit (GPU) may be used in place of, or in combination with, a CPU 602. Memory 604 may comprise a memory system including a dynamic random-access memory (DRAM), static random-access memory (SRAM), Flash (e.g., NAND Flash), or combinations thereof. In one embodiment, the bus 614 may comprise a Peripheral Component Interconnect Express (PCIe) bus. In some embodiments, the bus 614 may comprise multiple busses instead of a single bus.

Memory 604 illustrates an example of a non-transitory computer storage media for the storage of information such as computer-readable instructions, data structures, program modules, or other data. Memory 604 can store a basic input/output system (BIOS) in read-only memory (ROM), such as ROM 608 for controlling the low-level operation of the device. The memory can also store an operating system in random-access memory (RAM) for controlling the operation of the device.

Applications 610 may include computer-executable instructions which, when executed by the device, perform any of the methods (or portions of the methods) described previously in the description of the preceding figures. In some embodiments, the software or programs implementing the method embodiments can be read from a hard disk drive (not illustrated) and temporarily stored in RAM 606 by CPU 602. CPU 602 may then read the software or data from RAM 606, process them, and store them in RAM 606 again.

The device may optionally communicate with a base station (not shown) or directly with another computing device. One or more network interfaces in peripheral devices 612 are sometimes referred to as a transceiver, transceiving device, or network interface card (NIC).

An audio interface in peripheral devices 612 produces and receives audio signals such as the sound of a human voice. For example, an audio interface may be coupled to a speaker and microphone (not shown) to enable telecommunication with others or generate an audio acknowledgment for some action. Displays in peripheral devices 612 may comprise liquid crystal display (LCD), gas plasma, light-emitting diode (LED), or any other type of display device used with a computing device. A display may also include a touch-sensitive screen arranged to receive input from an object such as a stylus or a digit from a human hand.

A keypad in peripheral devices 612 may comprise any input device arranged to receive input from a user. An illuminator in peripheral devices 612 may provide a status indication or provide light. The device can also comprise an input/output interface in peripheral devices 612 for communication with external devices, using communication technologies, such as USB, infrared, Bluetooth®, or the like. A haptic interface in peripheral devices 612 provides tactile feedback to a user of the client device.

A GPS receiver in peripheral devices 612 can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), E-OTD, CI, SAI, ETA, BSS, or the like, to further determine the physical location of the device on the surface of the Earth. In one embodiment, however, the device may communicate through other components, providing other information that may be employed to determine the physical location of the device, including, for example, a media access control (MAC) address, Internet Protocol (IP) address, or the like.

The device may include more or fewer components than those shown, depending on the deployment or usage of the device. For example, a server computing device, such as a rack-mounted server, may not include audio interfaces, displays, keypads, illuminators, haptic interfaces, Global Positioning System (GPS) receivers, or cameras/sensors. Some devices may include additional components not shown, such as graphics processing unit (GPU) devices, cryptographic co-processors, artificial intelligence (AI) accelerators, or other peripheral devices.

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The preceding detailed description is, therefore, not intended to be taken in a limiting sense.

Throughout the specification and claims, terms may have nuanced meanings suggested or implied in context beyond an explicitly stated meaning. Likewise, the phrase "in an embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and," "or," or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, application-specific integrated circuit (ASIC), or other programmable data processing apparatus, such that the instructions, which execute via the processor of the computer or other programmable data processing apparatus, implement the functions/acts specified in the block diagrams or operational block or blocks. In some alternate implementations, the functions or acts noted in the blocks can occur out of the order noted in the operational illustrations. For example, two blocks shown in succession can in fact be executed substantially concurrently or the blocks can sometimes be executed in the reverse order, depending upon the functionality or acts involved.

We claim:

1. A method comprising:

receiving, by a processor, a deployment request for a pod that includes network transport requirements;

obtaining, by the processor, router resource data indicating current protocol support and resource utilization from a plurality of routers in a container orchestration environment;

retrieving, by the processor, topology mapping data indicating connections between worker nodes and the plurality of routers;

filtering, by the processor, available worker nodes based on the router resource data and topology mapping data to identify candidate nodes having access to router resources matching the network transport requirements;

selecting, by the processor, a node from the candidate nodes based on computational resource availability; and deploying, by the processor, the pod to the node.

2. The method of claim 1, wherein obtaining router resource data comprises:

collecting protocol statistics and resource utilization metrics from each router; and transmitting the protocol statistics and the resource utilization metrics to a cluster at predetermined intervals.

3. The method of claim 1, wherein retrieving topology mapping data comprises:

discovering router connections of the worker nodes through a link layer discovery protocol; and storing validated router connections in a topology database.

4. The method of claim 1, wherein specifying the network transport requirements comprises:

determining protocol support requirements by identifying required routing protocols from a container application configuration;

calculating route advertisement estimates based on a routing table size; and deriving protocol configuration parameters based on the routing protocols and calculated route advertisements.

5. The method of claim 1, wherein filtering available worker nodes comprises:

identifying routers having sufficient capacity for the protocol support requirements;

determining which worker nodes are connected to the identified routers through the topology mapping data; and filtering out worker nodes not connected to routers with sufficient capacity.

6. The method of claim 1, wherein selecting the node comprises:

evaluating computational resource availability on each candidate node;

applying affinity rules specified in the pod deployment request; and ranking remaining candidate nodes based on combined computational and network transport resource availability.

7. The method of claim 1, wherein obtaining router resource data comprises:

collecting alarm status information from each router;

monitoring router central processing unit (CPU) utilization and memory allocation; and determining available capacity for additional protocol sessions on each router.

8. A non-transitory computer-readable storage medium for tangibly storing computer program instructions capable of being executed by a computer processor, the computer program instructions defining steps of:

receiving, by a processor, a deployment request for a pod that includes network transport requirements;

obtaining, by the processor, router resource data indicating current protocol support and resource utilization from a plurality of routers in a container orchestration environment;

retrieving, by the processor, topology mapping data indicating connections between worker nodes and the plurality of routers;

filtering, by the processor, available worker nodes based on the router resource data and topology mapping data to identify candidate nodes having access to router resources matching the network transport requirements;

selecting, by the processor, a node from the candidate nodes based on computational resource availability; and deploying, by the processor, the pod to the node.

9. The non-transitory computer-readable storage medium of claim 8, wherein obtaining router resource data comprises:

collecting protocol statistics and resource utilization metrics from each router; and transmitting the protocol statistics and the resource utilization metrics to a cluster at predetermined intervals.

10. The non-transitory computer-readable storage medium of claim 8, wherein retrieving topology mapping data comprises:

discovering router connections of the worker nodes through a link layer discovery protocol; and storing validated router connections in a topology database.

11. The non-transitory computer-readable storage medium of claim 8, wherein specifying the network transport requirements comprises:

determining protocol support requirements by identifying required routing protocols from a container application configuration;

calculating route advertisement estimates based on a routing table size; and deriving protocol configuration parameters based on the routing protocols and calculated route advertisements.

12. The non-transitory computer-readable storage medium of claim 8, wherein filtering available worker nodes comprises:

identifying routers having sufficient capacity for the protocol support requirements;

determining which worker nodes are connected to the identified routers through the topology mapping data; and filtering out worker nodes not connected to routers with sufficient capacity.

13. The non-transitory computer-readable storage medium of claim 8, wherein selecting the node comprises:

evaluating computational resource availability on each candidate node;

applying affinity rules specified in the pod deployment request; and ranking remaining candidate nodes based on combined computational and network transport resource availability.

14. The non-transitory computer-readable storage medium of claim 8, wherein obtaining router resource data comprises:

collecting alarm status information from each router;

monitoring router central processing unit (CPU) utilization and memory allocation; and determining available capacity for additional protocol sessions on each router.

15. A device comprising:

a processor configured to:

receive a deployment request for a pod that includes network transport requirements;

obtain router resource data indicating current protocol support and resource utilization from a plurality of routers in a container orchestration environment;

retrieve topology mapping data indicating connections between worker nodes and the plurality of routers;

filter available worker nodes based on the router resource data and topology mapping data to identify candidate nodes having access to router resources matching the network transport requirements;

select a node from the candidate nodes based on computational resource availability; and deploy the pod to the node.

16. The device of claim 15, wherein obtaining router resource data comprises:

collecting protocol statistics and resource utilization metrics from each router; and transmitting the protocol statistics and the resource utilization metrics to a cluster at predetermined intervals.

17. The device of claim 15, wherein retrieving topology mapping data comprises:

discovering router connections of the worker nodes through a link layer discovery protocol; and storing validated router connections in a topology database.

18. The device of claim 15, wherein specifying the network transport requirements comprises:

determining protocol support requirements by identifying required routing protocols from a container application configuration;

calculating route advertisement estimates based on a routing table size; and deriving protocol configuration parameters based on the routing protocols and calculated route advertisements.

19. The device of claim 15, wherein filtering available worker nodes comprises:

identifying routers having sufficient capacity for the protocol support requirements;

determining which worker nodes are connected to the identified routers through the topology mapping data; and filtering out worker nodes not connected to routers with sufficient capacity.

20. The device of claim 15, wherein selecting the node comprises:

evaluating computational resource availability on each candidate node;

applying affinity rules specified in the pod deployment request; and ranking remaining candidate nodes based on combined computational and network transport resource availability.

21. The device of claim 15, wherein obtaining router resource data comprises:

collecting alarm status information from each router;

monitoring router central processing unit (CPU) utilization and memory allocation; and determining available capacity for additional protocol sessions on each router.

* * * * *